United States Patent
Teraoka et al.

(10) Patent No.: US 11,950,536 B2
(45) Date of Patent: Apr. 9, 2024

(54) VIBRATION REDUCTION OF HST CONTROL LEVER

(71) Applicant: KUBOTA CORPORATION, Osaka (JP)

(72) Inventors: Tasuku Teraoka, Suwanee, GA (US); Yuto Fujii, Suwanee, GA (US)

(73) Assignee: KUBOTA CORPORATION, Osaka (JP)

(*) Notice: Subject to any disclaimer, the term of this patent is extended or adjusted under 35 U.S.C. 154(b) by 547 days.

(21) Appl. No.: 17/132,370

(22) Filed: Dec. 23, 2020

(65) Prior Publication Data

US 2022/0192097 A1 Jun. 23, 2022

(51) Int. Cl.
*A01D 75/28* (2006.01)
*A01D 34/64* (2006.01)
*A01D 101/00* (2006.01)
*B62D 1/12* (2006.01)
*B62D 7/22* (2006.01)

(52) U.S. Cl.
CPC ............... *A01D 75/28* (2013.01); *B62D 1/12* (2013.01); *B62D 7/22* (2013.01); *A01D 34/64* (2013.01); *A01D 2101/00* (2013.01)

(58) Field of Classification Search
CPC .......... A01D 34/64; A01D 75/28; B62D 7/22; B62D 1/12
See application file for complete search history.

(56) References Cited

U.S. PATENT DOCUMENTS

| | | | |
|---|---|---|---|
| 8,342,489 B1 | 1/2013 | Richardson et al. | |
| 2008/0223593 A1 | 9/2008 | Eicher et al. | |
| 2012/0012141 A1 | 1/2012 | Pietrzak et al. | |
| 2014/0053371 A1 | 2/2014 | Feinstein | |
| 2016/0057924 A1 | 3/2016 | Asahara et al. | |
| 2019/0016214 A1 | 1/2019 | Melone et al. | |
| 2020/0383268 A1 | 12/2020 | Fujii | |

FOREIGN PATENT DOCUMENTS

JP 2005036852 A * 2/2005

OTHER PUBLICATIONS

May 1, 2018, Home Depot, "Zero Turn Mowers", https://web.archive.org/web/20180501155947/https://www.homedepot.com/b/Outdoors-Outdoor-Power-Equipment-Riding-Lawn-Mowers-Zero-Turn-Mowers/N-5yc1vZc5ak (Year: 2018).*

* cited by examiner

*Primary Examiner* — Kevin A Lathers
(74) *Attorney, Agent, or Firm* — Greenblum & Bernstein, P.L.C.

(57) ABSTRACT

A control lever of a working machine having a main operating frequency includes, a tube having a mass and a length extending from a first end to a second end. The tube defines a lumen extending from the second open end towards the first end of the tube. The control lever includes a rod having a predetermined mass and a length extending from a first end to a second end. The rod is fixed to the tube and is disposed in the lumen at a predetermined position with respect to the second end of the tube. In embodiments, the mass of the rod is determined based at least on the mass of the tube and the main operating frequency of the working machine, and the control lever has a natural frequency that is less than the main operating frequency of the working machine.

20 Claims, 6 Drawing Sheets

VIBRATION REDUCTION OF HST CONTROL LEVER

BACKGROUND

1. Field

The present disclosure relates to vibration reduction of control levers of a working machine, and more specifically, to control levers of a zero-turn riding lawnmower.

2. Description of Related Art

When a work vehicle is employed for work such as mowing grass, the work often takes a prolonged period of time. Riding comfort and superiority/inferiority of operability of the work vehicle can affect the fatigue and/or discomfort experienced by the operator of the work vehicle.

For some work vehicles, a steering operation of wheels is effected by a pair of right and left control levers. Vibrations due to rotation of parts of the work vehicle, such as an engine, and/or mowing blade(s) can be transmitted to such control levers. These vibrations can cause fatigue and discomfort to the operator, especially over prolonged periods of time.

SUMMARY

If sympathetic vibration (resonance) occurs in a control lever due to vibration of the other parts of the working machine (e.g., the engine), this can lead to increase of vibration of the lever which is transmitted to the operator. In addition, even when a spongy hand grip or handle is provided at a free end of the control lever, the vibration of the hand grip may not be suppressed favorably to prevent discomfort to the operator of the working machine.

One aspect of the present disclosure to reduce the unwanted vibration of the control levers is a control lever of a zero-turn mower which is powered by an engine (e.g., internal combustion engine). The control lever is configured to have a different (e.g., lower) natural frequency than an operating frequency (i.e., main operating frequency) of the engine of the mower. By differentiating the natural frequency of the control lever from the main operating frequency of the engine, resonance at the control lever can be reduced or avoided, which can reduce vibration of the control levers and improve operator comfort. In embodiments, the control levers are configured to reduce the vibration in the vertical direction ranging from about 20 Hz to about 200 Hz that propagate from the chassis(frame) to the control levers.

A control lever in accordance with this aspect of the disclosure can include a tube having a mass and a length extending from a first end to a second end. The tube defines a lumen extending from the second end towards the first end of the tube. That is, the lumen is the duct or cavity defined by the tube. The control lever also includes a rod having a predetermined mass and a length extending from a first end to a second end. The rod is fixed to the tube and disposed in the lumen at a predetermined position with respect to the second end of the tube.

In embodiments, the mass of the rod is determined based at least on the mass of the tube and the main operating frequency of the working machine such that the control lever has a natural frequency that is different from (e.g., less than) than the main operating frequency of the working machine. The main operating frequency may be the frequency (60 Hz) corresponding to the main operating engine speed of the mower, such as 3600 rpm for a two-stroke, 4-cylinder engine.

In embodiments, the rod comprises a solid member having a Young's modulus greater than 100 GPa and having a density greater than 4 g/cm$^3$. In embodiments, the length of the rod is between 15 mm and 200 mm. In embodiments, the rod is fixed to the tube at at least one of the first and second ends of the rod, such as with a weld.

In embodiments, the tube comprises a sidewall that defines a through-hole in communication with the lumen. The through-hole is configured to receive a stopper extending into the lumen to engage a first end of the rod when the rod is positioned at the predetermined position in the lumen of the tube.

In embodiments, at least a part of an outer surface of the rod is abutting on at least part of an inner surface of the tube. For example, in embodiments, the rod may have a diameter that is less a diameter of the lumen so that there is some gap or spacing therebetween when the rod and the tube are abutting.

Another aspect of the present disclosure is a zero-turn mower, which is powered by an engine having an operating frequency corresponding to an engine speed and which includes the control levers described above in accordance with an aspect of the present disclosure. The zero-turn mower includes a vehicle body, a pair of right and left driving wheels that movably support the vehicle body, and a pair of the afore-mentioned control levers pivotally coupled to the vehicle body. Each control lever has a first end and a second end. The first end of the control lever is pivotally coupled to the vehicle body and the second end is a free end. The control levers are configured to pivot about a horizontal axis extending in a vehicle body transverse direction and are capable of adjusting rotational speeds of the right and left driving wheels respectively. The control levers are also configured about a horizontal axis parallel with a vehicle body main direction, such that the control levers may pivoted to an "open" configuration to allow access to an operation station (which may include a seat, but may also include an operation station in which the operator is standing) by an operator, and pivoted to a "closed" position when the operator is ready to assume control of the machine.

Another aspect of the present disclosure is a method of manufacturing a control lever configured in accordance with the present disclosure. The method includes providing a tube extending from a first end to a second open end. The tube defines a lumen extending in a direction from the second open end toward the first end of the tube. Also, the method includes introducing a rod into the lumen of the tube through the second open end of the tube. The rod has a length extending from a first end to a second end. Also, the method includes positioning the rod in the lumen to a predetermined position with respect to the second end of the tube, and fixing the rod to the tube at the predetermined position.

In embodiments, when the rod is positioned at the predetermined position, the second end of the rod is flush with, recessed from, or protruding from the second open end of the tube. In embodiments, the method further comprises, before introducing the rod, inserting a stopper into the lumen through a hole defined in a wall of the tube in communication with the lumen. The stopper is configured to engage the first end of the rod when the rod is at the predetermined position. In embodiments, the method further includes, after securing the rod to the tube, removing the stopper from at least one of the hole in the wall of the tube and the lumen. In embodiments, fixing the rod to the tube includes welding the rod to the tube.

In embodiments, when the rod is in the predetermined position, the distance between the second end of the rod and the second end of the tube is 30 mm or less.

In accordance with another aspect of the disclosure, a control lever for maneuvering a zero-turn mower is provided. The zero-turn mower is powered by an engine having an operating frequency corresponding to an operating engine speed. The control lever includes a lateral portion having a first weight per unit length, and includes an upright portion coupled to the lateral portion. The upright portion has a second weight per unit length that is less than the first weight per unit length.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings, and wherein:

FIG. 4B is a schematic view of the handle of which FIG. 4A illustrates a portion thereof;

DETAILED DESCRIPTION OF THE DISCLOSURE

The particulars shown herein are by way of example and for purposes of illustrative discussion of exemplary embodiments of aspects of the present disclosure only and are presented in the cause of providing what is believed to be the most useful and readily understood description of the principles and conceptual aspects of the present disclosure. In this regard, no attempt is made to show structural details in more detail than is necessary for the fundamental understanding of the aspects of the present disclosure, the description taken with the drawings making apparent to those skilled in the art how the forms of the aspects of the present disclosure may be embodied in practice.

Figure 1:
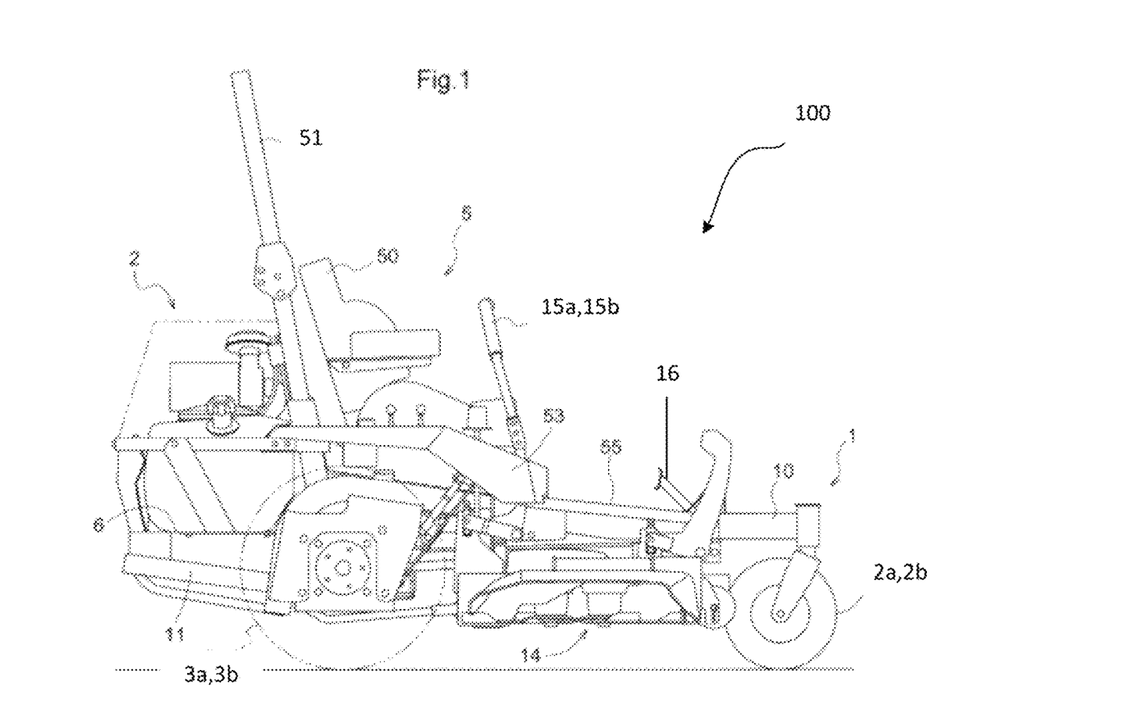
FIG. 1 is a right side view of a riding type lawnmower.
Figure 2A:
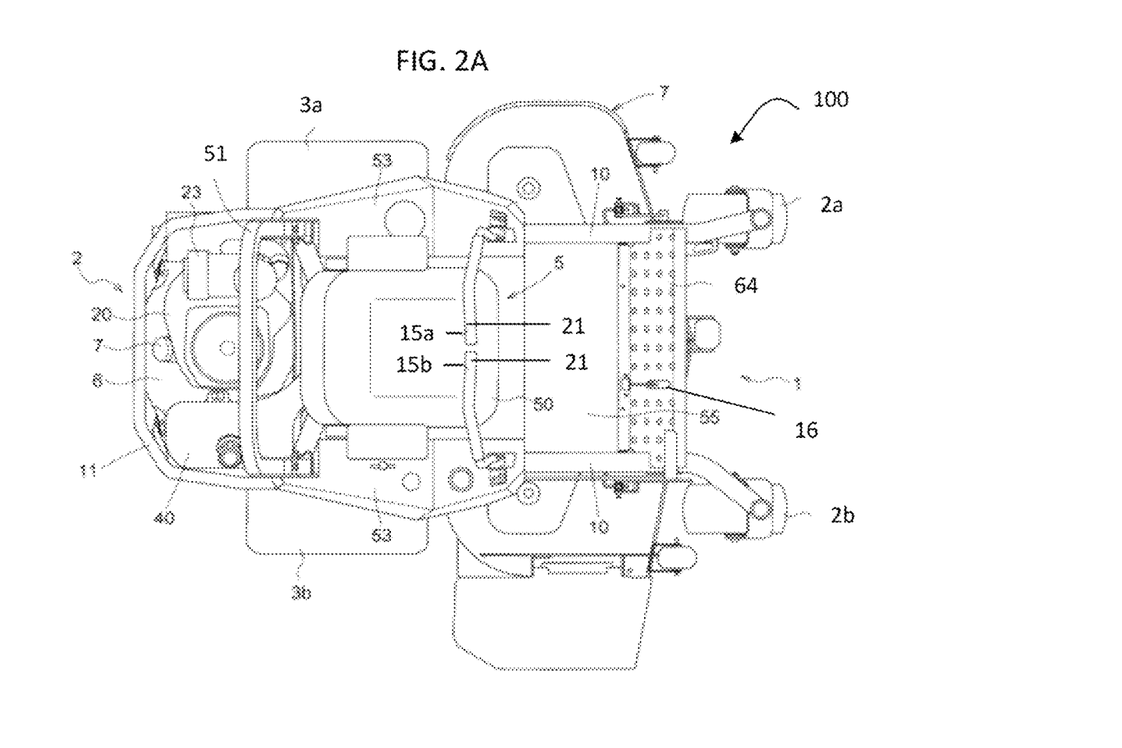
FIG. 2A is a plan view of the riding type lawnmower shown in FIG. 1.
Figure 2B:
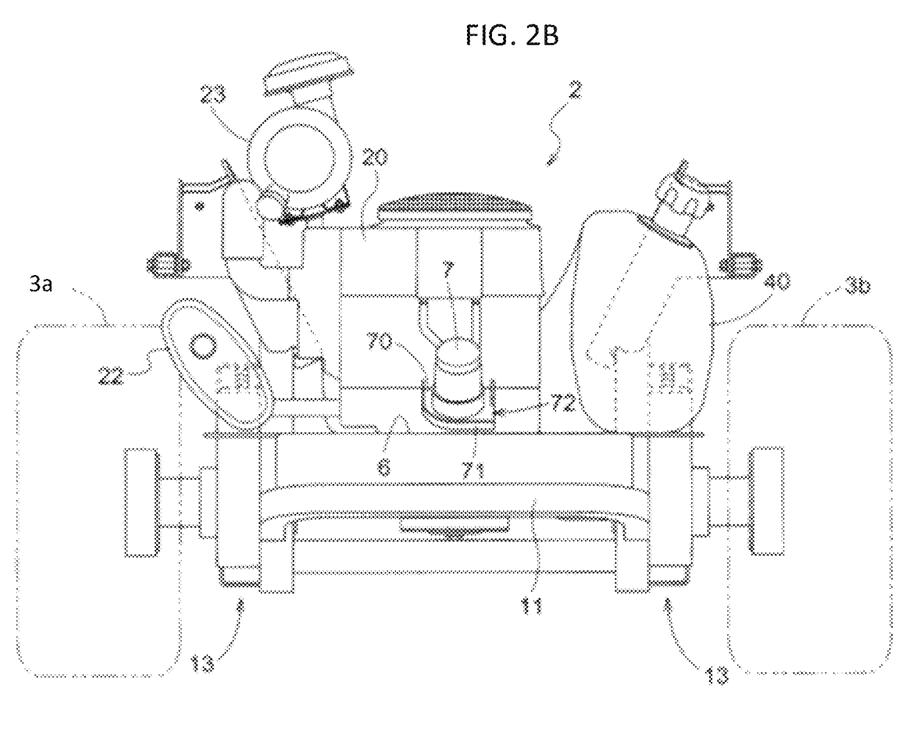
FIG. 2B is a rear view showing an engine and various associated components.

Hereafter, embodiments of the present disclosure are described with reference to the drawings. FIGS. 1, 2A and 2B show a zero-turn riding mower 100 (also referred to herein as a lawnmower) as an example of work vehicle. The mower 100 includes a vehicle body frame 1 which is supported by a pair of right and left front wheels 2a, 2b and a pair of right and left rear wheels 3a, 3b, with the respective rear wheels 3a, 3b being forward/reverse speed controllable independently of each other. Such riding mower 100 is called a "zero-turn mower". Further, a language "left/right direction" or "lateral direction" means a vehicle body transverse direction (vehicle body width direction) perpendicular to the vehicle body front/rear direction. Also, a word "upper" and a word "lower" respectively refer to positional relationship in the perpendicular direction (vertical direction) of the vehicle body, indicating relationship in terms of ground clearance height.

Principal constituting components of the vehicle body frame 1 are a pair of right and left front frame rails 10 formed of square pipe members and a rear frame 11 having a TJ-shape in its plan view. Between the pair of right and left front wheels 2a, 2b and the pair of right and left rear wheels 3a, 3b, a mower unit 14 is suspended via a lift mechanism from the front frame rails 10 to be liftable up/down.

On the front frame rails 10, a floor 55 formed of a metal plate is mounted in such a manner to cover them substantially entirely. At a front end of the floor 55, there is installed a footrest 64 formed of a thin plate. A brake pedal 16 extends upwardly from the footrest 64. At a rear portion of the floor 55, a driving section 5 is formed at a position one-step raised from the floor 55. At the center of the driving section 5, a driver's seat 50 is mounted. On right and left opposed sides of the driver's seat 50, fenders 53 and right and left steering levers 15a, 15b are disposed respectively. Incidentally, on the upper faces of the fenders 53, various operational levers, operational buttons, etc. are disposed. Rearwardly of the driver's seat 50, an arch-shaped ROPS 51 is mounted vertically. This ROPS 51 is formed of square pipe members. A driving section 2 is disposed in a region rearwardly of the ROPS 51 in a vehicle body front-rear direction. The driving section 2 includes an engine 20 which is an internal combustion engine and various engine auxiliary units.

To the U-shaped rear frame 11, there is installed a reinforcing plate 6 for reinforcing the rear frame 11. Further, the surface of the reinforcing plate 6 forms a substantially horizontal mounting face for mounting the engine 20. At the vicinity of the center of the reinforcing plate 6, the engine 20 is mounted under a posture with its output shaft protruding downwardly therefrom.

As shown in FIG. 2B, in a region on the right side of the engine 20, a fuel tank 40 is disposed. In a region on the left side of the engine 20, a muffler 22 is disposed. Upwardly of the engine 20, an air cleaner 23 is disposed. Rearwardly of the engine 20, an oil filter 7 is disposed as one oil equipment.

As shown schematically in FIG. 2B, there is provided a transmission configured to speed-change power from the engine 20 and to transmit the speed-changed power to the pair of right and left rear wheels 3a, 3b. The transmission includes HSTs 13 (hydrostatic transmissions) and a gear transmission mechanism. The respective HSTs are operated for speed change based on pivotal operations in the front-rear direction of the steering or control levers 15a, 15b provided on the right and left sides immediately forwardly of the driver's seat 50. When the left/right control levers 15a, 15b are pivotally operated in the front-rear direction, the HST corresponding thereto can be operated for speed change, so that the right and left rear wheels 3a, 3b can be driven at various speeds independently of each other.

During use, an operator sits in the seat 50 and grabs handle portions 21 of respective control levers 15a and 15b to maneuver the riding lawnmower 100. When the riding lawnmower 100 is being operated (i.e., is moving and/or mowing), the engine 20 will transmit vibrations through the body frame 10 to the control levers 15a, 15b, which will ultimately be transmitted to the hands of the operator at the handle portions 21 of the control levers 15a, 15b. If the natural frequency of the control levers 15a, 15b is close to the operating frequency of the engine 20, it is possible for resonance to occur at the control levers 15a, 15b, which will increase vibration at the handle portions 21. In the case of an internal combustion engine powered mower, a resonance condition can occur if the operating frequency of the engine 20 corresponding to the engine operating speed (e.g., frequency of 60 Hz at engine speed of 3600 rpm for a 2-cylinder, 4-stroke engine) is close to the natural frequency of the control levers 15a, 15b of the riding lawnmower. As will be readily appreciated, internal combustion engines having four or six cylinders have different frequencies corresponding to their engine operating speeds.

Figure 3:
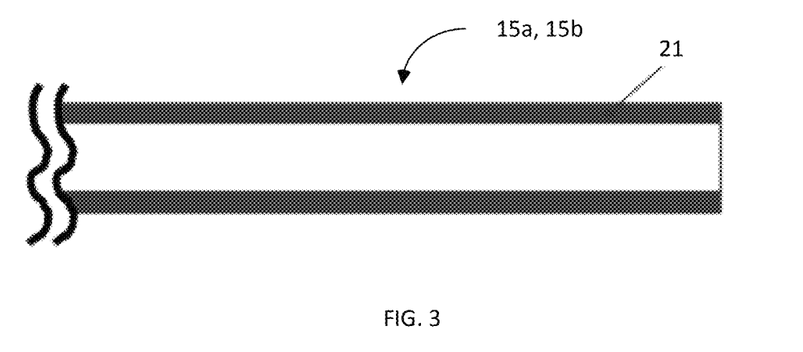
FIG. 3 is a schematic view of a handle portion of a control lever of the lawnmower of FIG. 1.

FIG. 3 shows details of a handle portion 21 of the control levers 15a and 15b, which is generally tubular and hollow at the handle portion 21. It is instructive now to consider the following equation that relates properties of the control levers 15a, 15b to their natural frequency:

$$\text{Natural frequency [Hz]} = \frac{1}{2\pi}\sqrt{\frac{k}{m}}, \quad [1]$$

where k represents the rigidity of the control lever, and m represents the mass of the control lever. From equation [1] it is appreciated that the control levers 15a, 15b can be modified, as discussed in greater detail below, to change their natural frequencies in a way that can avoid the resonance condition if the natural frequencies are sufficiently differentiated from the operating frequency of the engine 20 of the riding lawnmower. Specifically, as noted in equation [1], the rigidity k and mass m of the control levers 15a, 15b are parameters that can be modified to change the natural frequencies of the control levers 15a, 15b. For example, mass can be added to or removed from the control levers to respectively lower or raise their natural frequencies. Also, the stiffness of the control levers 15a, 15b can be increased or decreased to respectively raise or lower their natural frequencies. Moreover, while resonance avoidance can be achieved by lowering the natural frequencies of the control levers 15a, 15b below the operating frequency of the prime mover of the riding lawnmower, it is also possible to raise the natural frequency of the control levers 15a, 15b above the operating frequency of the engine 20 to differentiate their natural frequencies from the frequency of the engine 20.

Figure 4A:
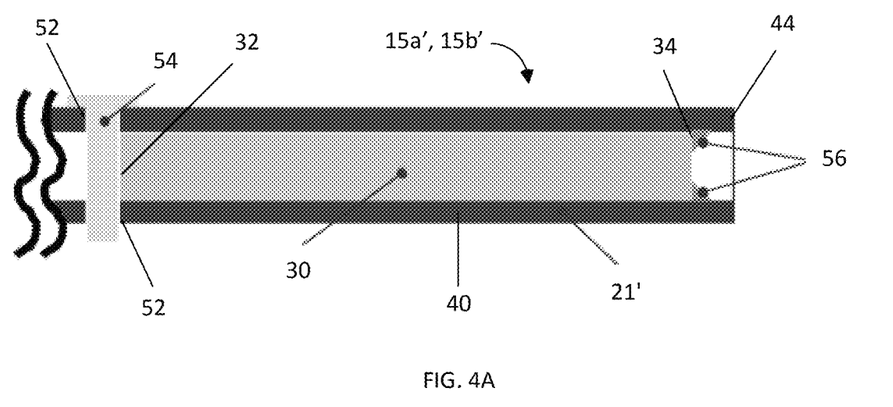
FIG. 4A is a schematic view of a handle portion of a control lever in accordance with an aspect of the present disclosure.
Figure 4B:
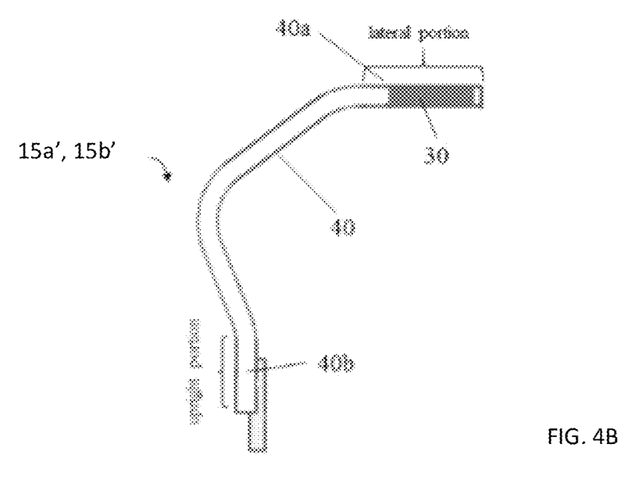

In accordance with the present disclosure, in the exemplary embodiments of control levers 15a' and 15b' described herein, the masses of the control levers 15a, 15b shown in FIG. 3 are modified (by increasing the mass) to cause a reduction in the natural frequencies of the resulting control levers. The embodiments of the control levers 15a', 15b' described herein are configured to reduce the vibration in the vertical direction ranging from about 20 Hz to about 200 Hz that propagate from the chassis(frame) 1 to the levers 15a', 15b'. FIGS. 4A and 4B show control levers 15a', 15b' which are a modification of the control levers 15a, 15b shown in FIG. 3. Specifically, in FIGS. 4A and 4B, control levers 15a', 15b' incorporate a mass, shown as a rod 30, for the purpose of lowering the natural frequencies of the control levers 15a', 15b' below the operating frequency of the engine 20 of the mower. As shown in FIG. 4B, in the exemplary embodiment, the control levers 15a' and 15b' are generally L-shaped tubes 40 (of uniform cross section) having a lateral section or portion 40a coupled to an upright section or portion 40b. The rod or mass 30 is located in the lateral portion or section 40a so that the weight per unit length (g/cm) of the lateral portion or section 40a is greater than the weight per unit length (g/cm) of the upright portion or section 40b.

Figure 5:
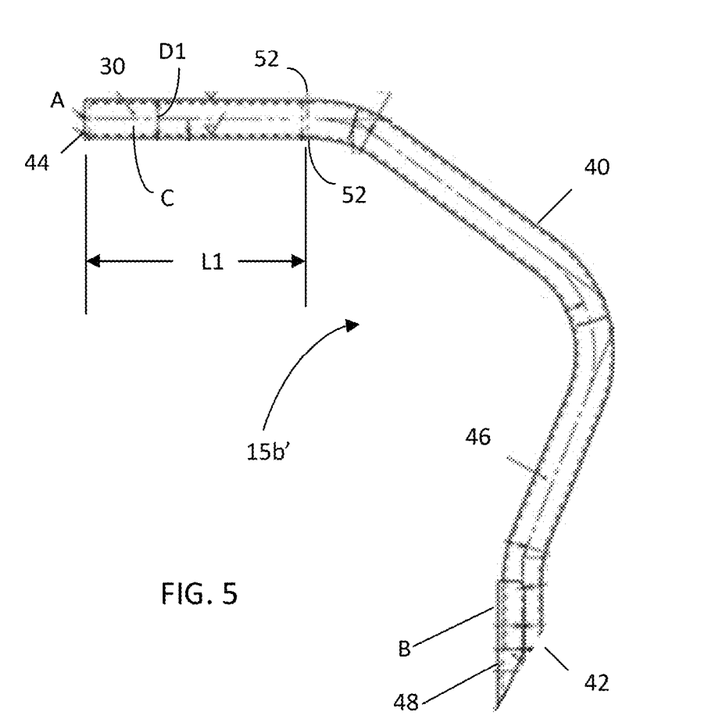
FIG. 5 is a front side view of an embodiment of a control lever in accordance with an aspect of this disclosure.
Figure 6:
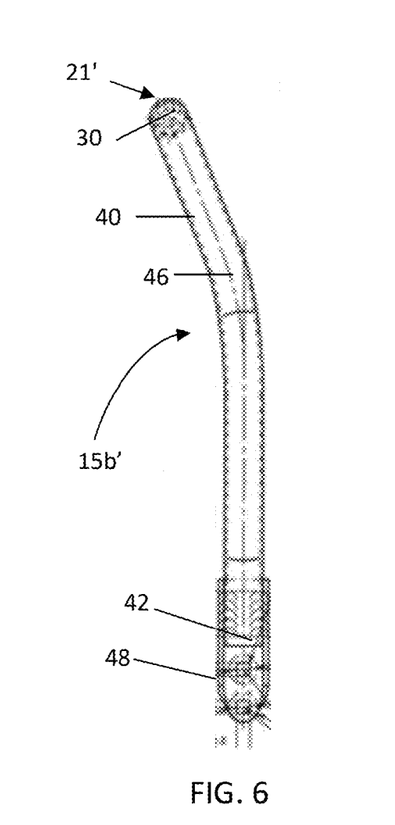
FIG. 6 is a right side view of the control lever shown in FIG. 5.

Additional details of the control lever 15b' may be appreciated from a consideration of FIGS. 5-9. Control lever 15a' is symmetric with control lever 15b', and may be configured in the same manner as control lever 15b'. As shown in FIGS. 5 and 6, the control lever 15b' includes a tube 40 of annular cross section that extends from a first end 42 to a second end 44. The tube 40 is generally hollow and defines a central lumen 46. In the example, the lumen has a diameter D1 of 22 mm.

Figure 9:
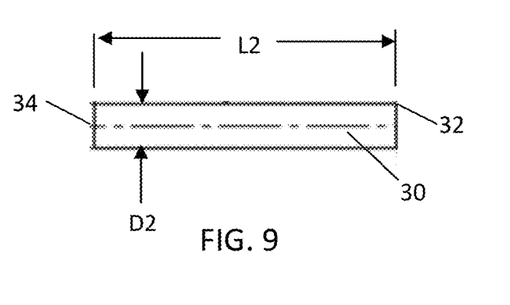
FIG. 9 is a detailed view of the rod labeled C in FIG. 5 viewed from the front side.

In the exemplary embodiment, the rod 30 is a solid cylindrical member having a diameter D2 of 20.6 mm that is less than diameter D1 to facilitate insertion of the rod 30 into the lumen 46 with minimal resistance to binding against the inner wall of the tube 40. In the exemplary embodiment, the rod is a solid member having a Young's modulus greater than 100 GPa and having a density greater than 4 g/cm³. As shown in the detail C of FIG. 5, the rod 30 is positioned in the lumen 46 and fixed to the tube 40 in a handle portion 21' of the control lever 15b'. As shown in FIG. 9, the rod 30 extends from a first end 32 to a second end 34. The rod 30 is positioned at a predetermined position relative to the tube 40 and is fixed in position to the tube 40. At the predetermined position, the second end 34 of the rod 30 is flush with or within 30.0 mm from the second end 44 of the tube 40. Thus, the second end 34 may be flush, recessed, or extended (i.e., protruding) with respect to the second end 44 of the tube. If the second end 34 is recessed, the recess may be used to provide clearance for a welding bead 56 (FIG. 4A) for fixing the rod 30 to the tube 40. Also, a mounting bracket 50 is coupled to the second end 42 of the tube 40 for pivotally coupling the control lever 15b' to the body of the riding lawnmower.

In the exemplary embodiment, the tube 40 defines holes 52 (FIGS. 4A and 5) through the sidewall of the tube 40. The holes 52 are spaced a distance L1 from the second end 44 of the tube 40. The holes 52 are in communication with the lumen 46 and are configured to receive a stopper (e.g., a clevis pin) 54 (FIG. 4A). The positioning of the rod 30 relative to the tube 40 may be facilitated by the stopper 54 protruding into the lumen 46 and engaging the first end 32 of the rod 30 when the rod 30 is at the predetermined position. In other words, the stopper 54 provides a positive stop limiting movement of the rod 30 relative to the tube 40 in one direction (e.g., leftward in FIG. 4A). The holes 52 may be diametrically formed as shown in FIGS. 4A and 5 so that the stopper 54 can extend completely across the lumen 46 and the tube 40, as shown in FIG. 4A.

As noted previously, the second end 34 of the rod 30 is fixed to the tube 40. In the example shown in FIG. 4A, a welding bead 56 between the second end 32 of the rod 30 and an inner surface of the wall of the tube 40 fixes the rod 30 to the tube 40.

Next, a process of manufacturing the control lever 15' in accordance with an aspect of the disclosure is described with reference to a workflow 100 shown in FIG. 10. At the start of the workflow 100, the aforementioned tube 40 is provided. At 102, the stopper 54 is introduced into the holes 52 and the lumen 46. At 104, the rod 30 is inserted into the lumen 46 through the second open end 44 of the tube 40 until the first end 34 of the rod 30 engages the stopper 54. At 106, the second end 34 of the rod 30 is welded to the tube 40. At 108, the stopper 54 is removed from the lumen 46 and the holes 52 leaving the rod 30 fixed to the tube 40 and disposed at a predetermined position relative to the tube 40 defined by the location of the stopper 54 and the holes 52.

The control levers 15a', 15b', which are configured in accordance with the description, have been shown experimentally to be effective in avoiding resonance with the internal combustion engine 20 of a riding lawnmower. As noted above from equation [1], the mass and stiffness of the control levers are two parameters related to the natural frequency of the control levers. In experimental testing that was conducted, control lever vibration was studied for seven different configurations of control levers to determine the effect of increased mass of the control lever on vibration reduction of the control lever. A first configuration of control lever tested did not include any rod (akin to the control levers 15a, 15b of FIG. 3), while six other control lever configurations (having the configuration of control levers 15a', 15b') included rods 30 of the same material and diameter, but differing lengths, L2 (FIG. 9). Thus, all of the rods 30 tested had different masses. Table 1, below, summarizes the parameters of each of the seven tested control levers.

| Tested Control Lever | Equivalent Reference Number | Rod Length, L2 (mm) | Stopper Hole Distance, L1 (mm) |
|---|---|---|---|
| 1 | 15a, 15b | No rod | No hole |
| 2 | 15a', 15b' | 35 | 41.5 |
| 3 | 15a', 15b' | 75 | 81.5 |
| 4 | 15a', 15b' | 115 | 121.5 |
| 5 | 15a', 15b' | 135 | 141.5 |
| 6 | 15a', 15b' | 141 | 147.5 |
| 7 | 15a', 15b' | 148 | 154.5 |

For each of the six experimental configurations numbered 2 to 7, the second end 34 of each rod 30 was spaced 3.0 mm from the second end 44 of the tube 40.

Figure 12:
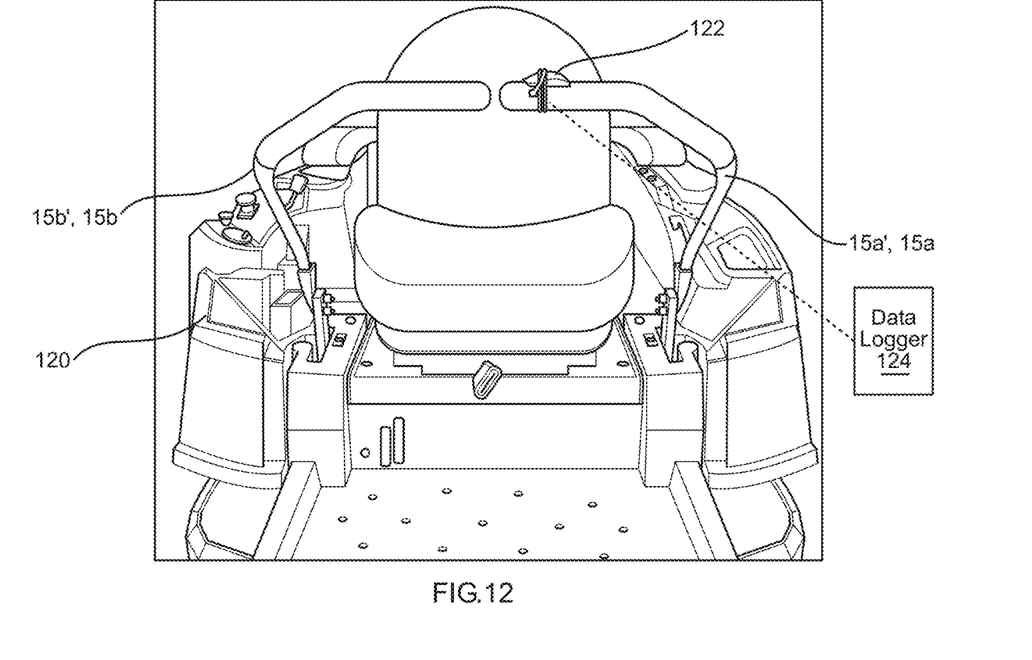
FIG. 12 shows a riding lawnmower instrumented to obtain the test results shown in FIG. 11.

As shown in FIG. 12, the respective control levers 15a', 15b' or 15a, 15b were connected to the riding lawnmower 120 constructed like riding lawnmower 100 and which included 2-cylinder, 4-stroke engine. One handle portion 21', 21 of respective control levers 15a', 15a was instrumented with a Model SEN026 triaxial shear ICP accelerometer 122 (a product of Larson Davis) connected to a Krypton data logger 124 (a product of Dewesoft). The operating frequency of the engine of the mower 120 was determined to be 60 Hz at the engine speed of 3600 rpm. During testing, vibration in the control levers 15a', 15a was measured as engine speed (rpm) was increased through a range of speeds up to the main engine operating speed of 3600 rpm corresponding to the engine frequency (60 Hz) at which the resonance condition is most often encountered in the handle portions 21. This is because during operation of the riding mower 120, the engine 20 is governed to operate at or around a main operating speed (i.e., 3600 rpm).

Figure 11:
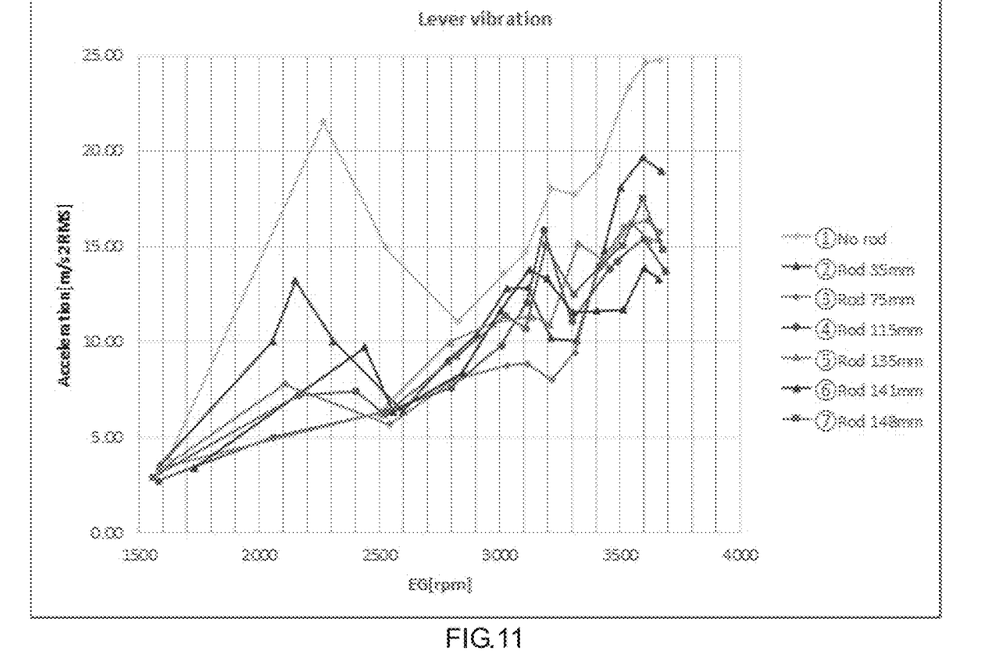
FIG. 11 shows control lever vibration test results for various configurations of control levers having incorporated rods of varying lengths.

FIG. 11 shows a graph of acceleration of the tested control levers 15a', 15a versus engine speed. The circled numbers in the legend in FIG. 11 correspond to the test configurations listed in Table 1, above. Based on equation [1] noted above, at the engine frequency (60 Hz) corresponding to the main operating engine speed of 3600 rpm, it would be expected to see the greatest reduction in acceleration for the lever configuration with a natural frequency furthest from the natural (main) operating frequency of the engine of the riding lawnmower 120. Since all of the rods 30 tested were made of the same material (e.g., steel) and had the same diameter (D2) 20.6 mm, the weight of the rods 30 were directly related to their length. Thus, based on equation [1], it was expected prior to testing that the longest, and thus heaviest rod (148 mm), would provide the greatest reduction in natural frequency and acceleration. However, as shown in the test results shown in FIG. 11, control levers using at least two other shorter rods (141 mm and 115 mm) resulted in lower acceleration at main operating frequency (60 Hz) corresponding to the engine speed of 3600 rpm. These results were unexpected and counterintuitive since the optimum result is not predicted by the model of equation [1], and use of a smaller mass in the control levers 15a', 15b' is considered proceeding contrary to conventional wisdom.

Above, a concrete description is given based on the embodiments according to aspects of the present disclosure. However, the present disclosure is not limited to the above-described embodiments and may be modified within a scope not deviating from the substance of the present disclosure.

Within a scope not deviating from the substance of the present disclosure, appropriate modifications may be made to detailed structures and operations of each component configuring the control levers 15a, 15b. For example, in the above-described embodiment shown in FIG. 4A, a stopper 54 is used to facilitate positioning the rod 30 in the lumen 46 of the tube 40. However, the present disclosure is not limited to this. For example, while the stopper 54 is shown in FIG. 4A, it will be appreciated that any structure protruding into the lumen 46 providing a positive stop for the rod 30 can be used. For example, a dimple or protrusion may be formed on the inner surface of the tube at the location of the holes 52 by deforming the wall of the tube 40 with a punch so that the first end 32 of the rod can engage the dimple or protrusion.

Also, in the above-described embodiment shown in FIG. 4A, a weld 56 is used to fix the rod 30 to the tube 40. However, the present disclosure is not limited to this. For example, alternative fixation methods may be used for fixing the rod 30 to the tube 40, including without limitation adhesives, press fit, threaded connection between the rod and the tube, and mechanical fasteners. For example, screws or rivets may be used to connect the wall of the tube 40 directly to the rod 30.

Figure 7:
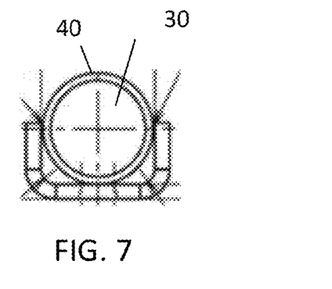
FIG. 7 is an elevation view of the detail labeled A in FIG. 5 viewed from the left side.
Figure 8:
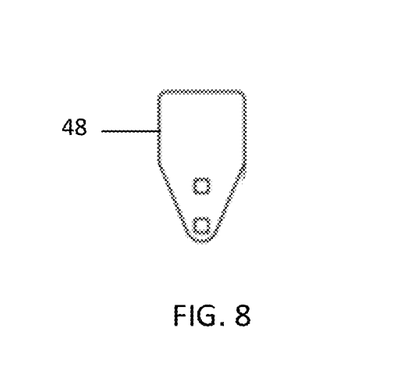
FIG. 8 is an elevation view of the detail labeled B in FIG. 5 viewed from the left side.

Also, in the exemplary embodiment shown in FIGS. 7 and 9, the rod 30 is formed as solid cylinder with a uniform diameter along its length, L. However, the present disclosure is not limited to this. In alternate embodiments, the rod 30 may have other shapes. For example, the rod may be elongated and be tapered along all or a portion of its length. Further, while the rod 30 shown in the exemplary embodiment is solid, the present disclosure is not limited to this. The rod may be solid or hollow (e.g., a tube) or may have at least one enclosed cavity. Also, while the rod 30 may be made from the same material as the tube 40 (e.g., steel), the present disclosure is not limited to this.

Figure 10:
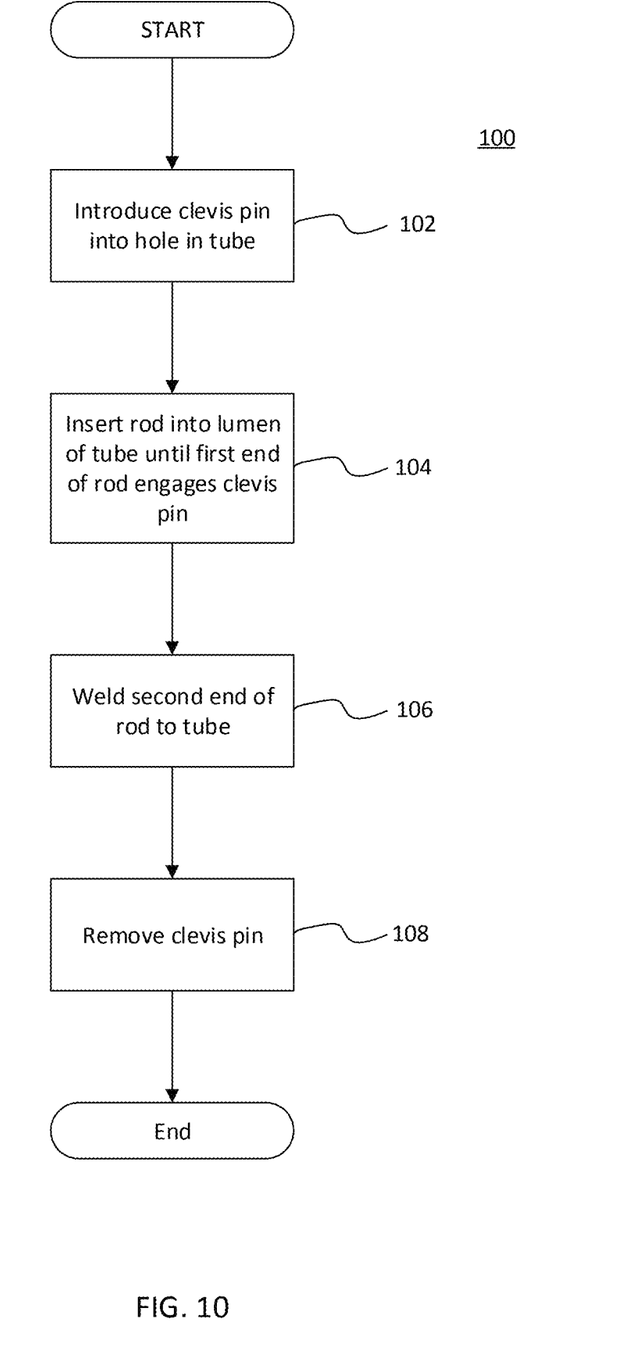
FIG. 10 is a flowchart of a method of manufacturing a control lever configured in accordance with an aspect of the present disclosure.

In addition, in the exemplary workflow shown in FIG. 10, the stopper 54 is removed from the through-holes 52 in the wall of the tube 40 as well as from the lumen 46. However, the present disclosure is not limited to this. For example, the stopper 54 may be configured to break or separate so that rather than pull the stopper 54 out of both the holes 52 and the lumen 46, a portion of the stopper 54 outside the tube 40 can be configured break away from a portion of the stopper 54 remaining inside the lumen 46. Moreover, in the exemplary workflow shown in FIG. 10, the order of the workflow is not limited to the order directly described in the present application, and it is possible to change the order or execute portions of the workflow all at one time or incrementally as needed.

It is noted that the foregoing examples have been provided merely for the purpose of explanation and are in no way to be construed as limiting of the present disclosure. While the present disclosure has been described with reference to exemplary embodiments, it is understood that the words which have been used herein are words of description and illustration, rather than words of limitation. Changes may be made, within the purview of the appended claims, as presently stated and as amended, without departing from the scope and spirit of the present disclosure in its aspects. Although the present disclosure has been described herein with reference to particular structures, materials and embodiments, the present disclosure is not intended to be limited to the particulars disclosed herein; rather, the present disclosure extends to all functionally equivalent structures, methods and uses, such as are within the scope of the appended claims.

The present disclosure is not limited to the above described embodiments, and various variations and modifications may be possible without departing from the scope of the present disclosure.

In the foregoing embodiment, the internal combustion engine 20 was shown as the prime mover of the riding lawn mower 100. This engine 20 can be replaced by one or more electric motors connected to an electrical power source, such as a battery or fuel cell. Further alternatively, the HST transmission 13 can be replaced by a pair of right and left electric motors powered by a battery for directly driving the rear wheels 3a, 3b. Namely, it is possible to arrange such a pair of right and left motors that can distribute power from a battery independently to the pair of right and left driving wheels 3a, 3b and that the power output to the pair of right and left motors (and thus speed of the wheels 3a, 3b) are adjustable by the respective maneuvering levers 15a, 15b. That is, an operator can move the maneuvering levers 15a, 15b to control the relative speeds of the right and left motors (and thus driving wheels 3a, 3b), which can be used to effect motion of the riding mower.

The work vehicle of this invention is not limited to the riding type lawnmower. The inventive work vehicle can be a fertilizer spreader vehicle or an insecticide or drug spreader vehicle or can even be a field transporter vehicle or a snow plow vehicle.

What is claimed is:

1. A control lever for maneuvering a zero-turn mower, the mower being powered by an engine having an operating frequency corresponding to an operating engine speed, the control lever comprising:
   a tube having a mass and a length extending from a first end to a second end, the tube defining a lumen extending from the second end towards the first end of the tube;
   a rod having a predetermined mass and a length extending from a first end to a second end, the rod fixed to the tube such that the rod is fixed in position relative to the tube and disposed in the lumen at a predetermined position with respect to the second end of the tube.

2. The control lever according to claim 1, wherein:
   the mass of the rod is determined based at least on the mass of the tube and the main operating frequency of the working machine, and wherein the control lever has a natural frequency that is less than the operating frequency of the working machine.

3. The control lever according to claim 1, wherein:
   the rod is a solid member having a Young's modulus greater than 100 GPa and having a density greater than 4 g/cm³.

4. The control lever according to claim 1, wherein:
   the rod is fixed to the tube at at least one of the first and second ends of the rod.

5. The control lever according to claim 4, wherein:
   the rod is fixed to the tube with a weld.

6. The control lever according to claim 1, wherein:
   the tube has a sidewall that defines a through-hole in communication with the lumen, and
   wherein the hole is configured to receive a stopper extending into the lumen to engage a first end of the rod when the rod is positioned at the predetermined position.

7. The control lever according to claim 1, wherein:
   the length of the rod is between 15 mm and 200 mm.

8. The control lever according to claim 1, wherein:
   at least a part of an outer surface of the rod is abutting on at least a part of an inner surface of the tube.

9. A zero-turn mower powered by an engine having an operating frequency corresponding to an operating engine speed, the mower comprising:
   a vehicle body;
   a pair of right and left driving wheels that movably support the vehicle body;
   a pair of control levers pivotally coupled to the vehicle body, the control levers configured to pivot about a horizontal axis extending in a vehicle body transverse direction and capable of adjusting rotational speeds of the right and left driving wheels respectively, wherein each control lever includes:
   a tube having a mass and a length extending from a first end, pivotally coupled to the vehicle body, to a second free end, the tube defining a lumen extending in a direction from the second end toward the first end of the tube;
   a rod having a predetermined mass and a length extending from a first end to a second end, the rod fixed to the tube such that the rod is fixed in position relative to the tube and disposed in the lumen at a predetermined position with respect to the second end of the tube.

10. The zero-turn mower according to claim 9, wherein:
   the mass of the rod is determined based at least on the mass of the tube and the operating frequency of the working machine, and wherein the control lever has a natural frequency that is less than the operating frequency of the working machine.

11. The zero-turn mower according to claim 9, wherein:
   the rod length is between 15 mm and 200 mm.

12. The zero-turn mower according to claim 9, wherein:
   the tube has a sidewall that defines a through-hole in communication with the lumen, and
   wherein the hole is configured to receive a stopper extending into the lumen to engage a first end of the rod when the rod is positioned at the predetermined position.

13. The zero-turn mower according to claim 9, wherein:
   the rod is fixed to the tube at at least one of the first and second ends of the rod.

14. A control lever for maneuvering a zero-turn mower, the mower being powered by an engine having an operating frequency corresponding to an operating engine speed, the control lever comprising:
- a lateral portion having a rod arranged therein and fixed in position relative to the lateral portion, the lateral portion having a first weight per unit length; and
- an upright portion coupled to the lateral portion, the upright portion having a second weight per unit length that is less than the first weight per unit length.

15. A method of manufacturing a control lever for maneuvering a zero-turn mower that is powered by an engine having an operating frequency corresponding to an operating engine speed, the method comprising:
- providing a tube extending from a first end to a second end, the tube defining a lumen extending in a direction from the second end toward the first end of the tube;
- introducing a rod into the lumen of the tube through the second end of the tube, the rod having a length extending from a first end to a second end;
- positioning the rod in the lumen to a predetermined position with respect to the second end of the tube; and
- fixing the rod to the tube at the predetermined position such that the rod is fixed in position relative to the tube.

16. The method according to claim 15, wherein:
when the rod is positioned at the predetermined position, the second end of the rod is flush with, recessed from, or protruding from the second end of the tube.

17. The method according to claim 15, further comprising:
- before introducing the rod, inserting a stopper into the lumen through a hole defined in a wall of the tube in communication with the lumen,
- wherein the stopper is configured to engage the first end of the rod when the rod is at the predetermined position.

18. The method according to claim 17, further comprising:
- after securing the rod to the tube, removing the stopper from at least one of the hole in the wall of the tube and the lumen.

19. The method according to claim 15, wherein:
fixing the rod includes welding the rod to the tube.

20. The method according to claim 15, wherein:
when the rod is in the predetermined position, the distance between the second end of the rod and the second end of the tube is 30 mm or less.

* * * * *